(12) United States Patent
Freiberger

(10) Patent No.: US 10,533,908 B1
(45) Date of Patent: Jan. 14, 2020

(54) ACTIVATION COMPONENT TESTING APPARATUS

(71) Applicant: HONEYWELL FEDERAL MANUFACTURING & TECHNOLOGIES, LLC, Kansas City, MO (US)

(72) Inventor: Peter Freiberger, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 15/885,182

(22) Filed: Jan. 31, 2018

(51) Int. Cl.
*G01L 5/00* (2006.01)
*G01L 1/26* (2006.01)
*G01L 1/04* (2006.01)
*H01H 11/00* (2006.01)

(52) U.S. Cl.
CPC .......... *G01L 1/26* (2013.01); *G01L 1/04* (2013.01); *G01L 5/0009* (2013.01); *G01L 5/0038* (2013.01); *H01H 11/0062* (2013.01)

(58) Field of Classification Search
CPC . G01L 1/26; G01L 1/04; G01L 5/0009; G01L 5/0038; H01H 11/0062
USPC .......................................................... 73/790
See application file for complete search history.

(56) References Cited

U.S. PATENT DOCUMENTS

| 4,771,674 A * | 9/1988 | Hugdahl ............... G05D 15/00 91/217 |
| 5,063,276 A | 11/1991 | Woodard |
| 5,865,795 A | 2/1999 | Schiff |
| 5,890,996 A * | 4/1999 | Frame ................. A63B 21/154 482/111 |
| 7,547,156 B2 | 6/2009 | Kienzler |
| 7,988,660 B2 | 8/2011 | Byland et al. |
| 2006/0018799 A1* | 1/2006 | Wong ..................... A61B 10/02 422/400 |
| 2016/0230505 A1* | 8/2016 | Garcia .................... E21B 23/01 |
| 2017/0197032 A1* | 7/2017 | Demas ................... A61M 5/30 |

FOREIGN PATENT DOCUMENTS

EP 0961097 A2 12/1999

* cited by examiner

*Primary Examiner* — Max H Noori
(74) *Attorney, Agent, or Firm* — Hovey Williams LLP

(57) ABSTRACT

An activation component testing apparatus comprising an outer sleeve, an inner sleeve, a plunger, a number of bearings, and a compression spring. The outer sleeve forms an interior chamber having opposing first and second openings. The plunger, bearings, inner sleeve, and compression spring are disposed in the central cavity. The plunger includes a number of bearing recesses that engage the bearings such that the plunger is configured to transfer a compressive force applied to the activation component through the inner sleeve and compression spring to a load cell via the bearings when the plunger is in an extended position and urge the bearings out of engagement with the bearing recesses when the plunger is in a maximum force position such that the plunger cannot transfer additional compressive force to the load cell when the plunger is moved beyond the maximum force position.

20 Claims, 3 Drawing Sheets

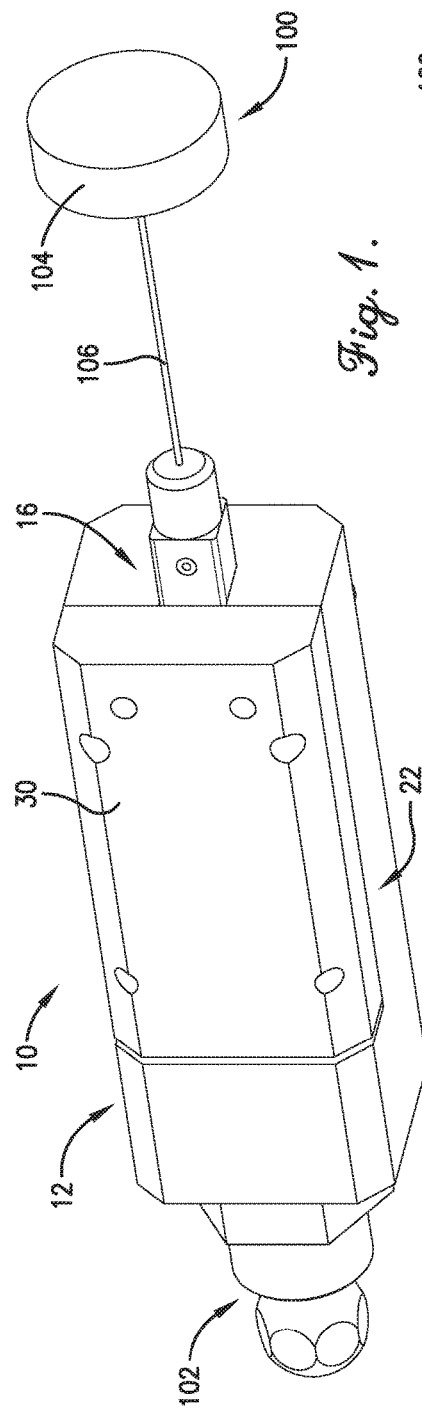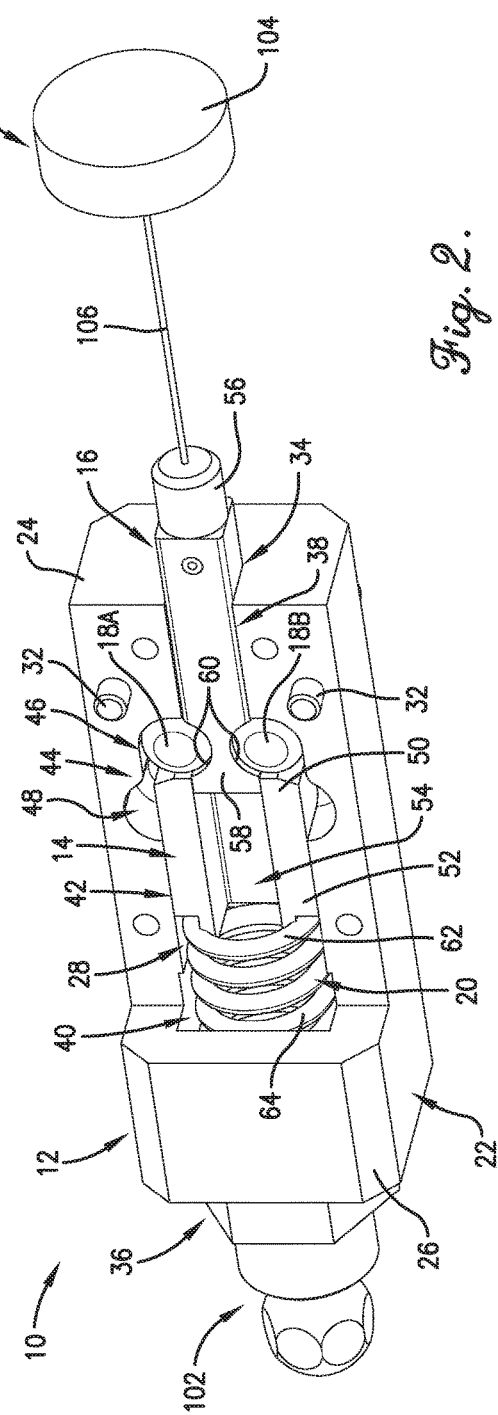

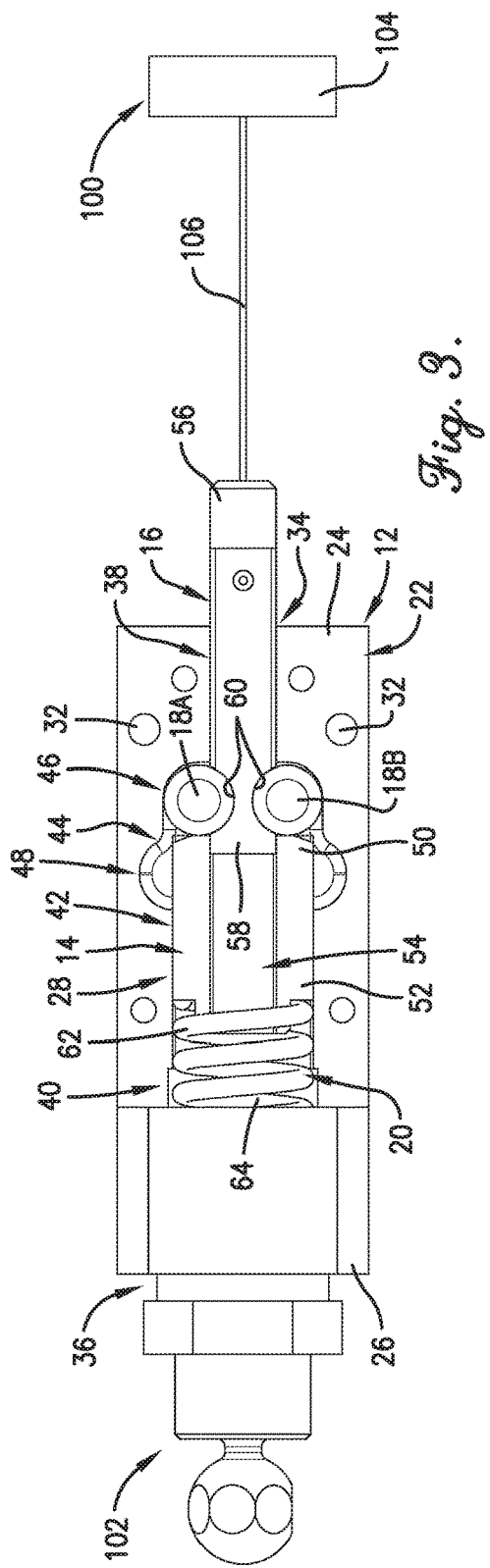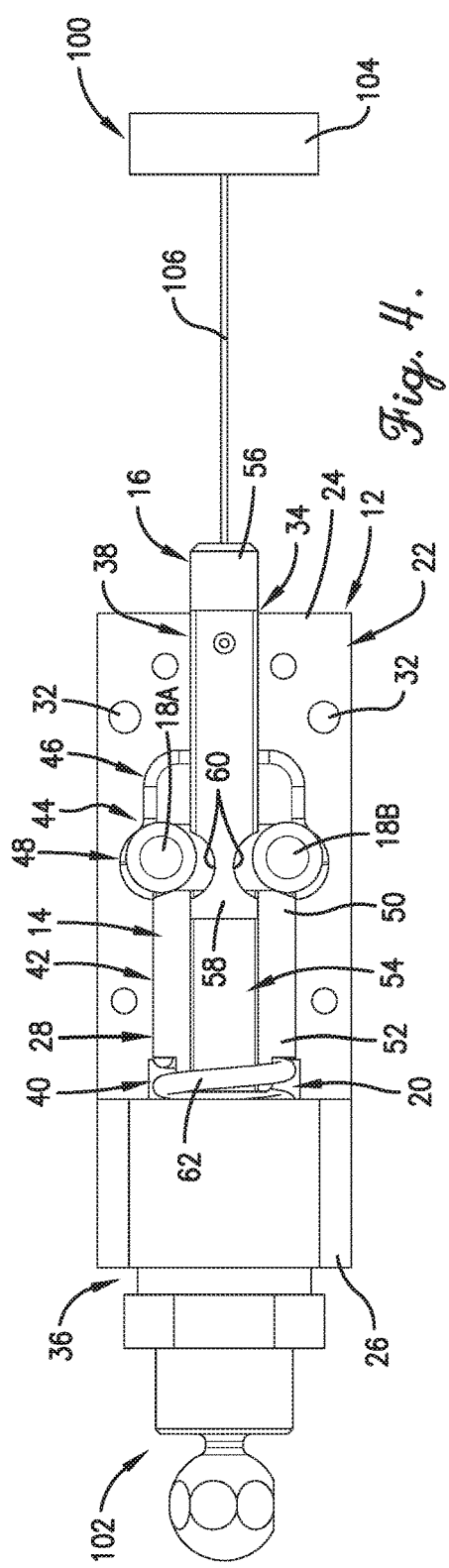

ACTIVATION COMPONENT TESTING APPARATUS

STATEMENT REGARDING FEDERALLY-SPONSORED RESEARCH OR DEVELOPMENT

This invention was made with Government support under Contract No.: DE-NA0000622 awarded by the United States Department of Energy/National Nuclear Security Administration. The Government has certain rights in the invention.

BACKGROUND

Pushbutton switches and other activation components are often tested with load cells that measure the force applied to the activation components. Unfortunately, the activation components are often subjected to excessive force during load testing, which can damage the activation components. This force is then transferred to the load cells, potentially damaging them as well. Replacing damaged activation components and load cells can be costly and time consuming. Damaging prototypes of activation components is particularly undesirable since the damaged prototypes must be fixed or re-fabricated.

SUMMARY

Embodiments of the present invention solve the above-described and other problems and limitations by providing a testing apparatus that prevents an activation component undergoing load testing and its associated load cell from being subjected to excessive force.

An embodiment of the testing apparatus broadly includes an outer sleeve, an inner sleeve, a plunger, a set of bearings, and a compression spring. The testing apparatus is configured to be coupled between an activation component that is being tested and a load cell for both minimizing the amount of force that can be applied to the activation component and limiting the amount of applied force that can be transferred to the load cell.

The outer sleeve supports the other components of the testing apparatus and has an outer wall, first and second ends, and a hollow interior chamber that extends between the first and second ends. The outer sleeve may also have a cover plate that can be removed to provide access to the interior chamber and a number of connectors for securing the cover plate over the interior chamber.

The interior chamber of the outer sleeve has a first opening near the first end of the outer sleeve and a second opening near the second end. Between the first and second openings are a number of differently-sized chamber sections for receiving and accommodating movement of the inner sleeve, plunger, bearings, and compression spring.

A plunger-receiving section communicates with the first opening and receives the plunger as described in more detail below. The plunger-receiving section may have any cross-sectional shape and any internal dimensions. In one embodiment, the plunger-receiving section is rectangular in cross section and has a width of approximately one half of an inch and a height of approximately one half of an inch.

A spring-receiving section communicates with the second opening and receives the compression spring as described in more detail below. The spring-receiving section may also have any cross-sectional shape and any internal dimensions. In one embodiment, the spring-receiving section is circular in cross section and has a diameter of approximately one inch.

An inner sleeve-receiving section is positioned between the plunger-receiving section and the spring-receiving section and encloses the inner sleeve as described in more detail below. The inner sleeve-receiving section may also have any cross-sectional shape and any internal dimensions. In one embodiment, the inner sleeve-receiving section is rectangular in cross section and has a width of approximately one inch and a height of approximately one inch.

Finally, a bearing guide section adjacent the plunger-receiving section and the inner sleeve-receiving section receives and guides the bearings as described in more detail below. The bearing guide section has a first relatively narrower portion closer to the first opening and a second relatively wider portion adjacent the inner sleeve-receiving portion. The bearing guide section may also have any cross-sectional shape and any internal dimensions. In one embodiment, the bearing guide section has a depth of approximately one inch for accommodating roller bearings as described in more detail below.

The inner sleeve is positioned within the inner sleeve-receiving section of the interior chamber and can be moved within the interior chamber as described in more detail below. The inner sleeve has outer dimensions slightly less than the dimensions of the inner sleeve-receiving portion of the interior chamber and opposing first and second ends. The inner sleeve also has a hollow central chamber between its first and second ends that is in axial alignment with and has approximately the same dimensions as the plunger-receiving portion of the interior chamber, the purpose of which will be described below.

The plunger translates within the plunger-receiving section of the interior chamber as described in more detail below. The plunger has opposing first and second ends and a number of bearing recesses near the second end. The first end faces or extends out of the first opening of the interior chamber and is configured to be connected to a shaft of the activation component. The second end faces the inner sleeve and is configured to be urged into the central chamber of the inner sleeve as described in more detail below. The bearing recesses engage the bearings as described in more detail below and in one embodiment include two opposing partial-cylindrical recesses.

The bearings are positioned in the bearing guide section of the interior chamber and can be moved between the first and second portions of the bearing guide section via the bearing recesses of the plunger as described in more detail below. The bearings may be roller bearings, ball bearings, bushings, tapered bearings, or any other suitable bearings.

The compression spring is positioned in the spring-receiving section of the interior chamber between the inner sleeve and the second end of the outer sleeve. The compression spring may be a coil spring, leaf spring, or any other suitable elastic element. In one embodiment, the spring is a coil spring in axial alignment with the inner sleeve and plunger.

In use, a compressive force may be applied to the activation component when the plunger is in an extended position so that the plunger is urged farther into the interior chamber (i.e., towards the load cell). The plunger in turn moves the bearings from the first portion of the bearing guide section into the second portion of the bearing guide section via the bearing recesses. The bearings push the inner sleeve as they move to the second portion of the bearing guide section such that the inner sleeve begins to compress the compression spring. The compression spring in turn transfers a compressive force to the load cell.

As the activation component is being depressed, the amount of compressive force required to depress it farther, and hence the amount of compressive force transferred to the load cell, is directly proportional to the distance the activation component has moved from the extended position since the compression spring is being compressed in the process. However, once a predetermined maximum force has been applied to the activation component, the plunger reaches a maximum force position at which point the bearing recesses urge the bearings into the second portion of the bearing guide section and out of engagement with the bearing recesses. This disconnects the path of force transfer between the plunger and the load cell.

As the activation component is depressed beyond the maximum force position, the plunger moves farther into the interior chamber without depressing the compression spring farther since the bearings are no longer in engagement with the bearing recesses of the plunger. Thus, the activation component is no longer subjected to resistance from the compression spring and the plunger does not transfer additional force to the load cell. At the same time, the plunger retains the bearings in the second portion of the bearing guide section of the interior chamber such that the bearings continue to exert the predetermined maximum force on the inner sleeve and hence the spring and load cell. Note that the second end of the plunger may continue relatively unobstructed into the central chamber of the inner sleeve without transferring any force to the inner sleeve, compression spring, and load cell via the bearings.

The activation component may then be pulled away from the testing apparatus or otherwise reset so as to retract the plunger from beyond the maximum force position. Once the plunger returns to the maximum force position, the inner sleeve and the outer wall of the outer sleeve urge the bearings back into engagement with the bearing recesses of the plunger. The activation component may be further withdrawn to the extended position such that the inner sleeve and the first portion of the bearing guide section urge the bearings back into engagement with the bearing recesses of the plunger. This also allows the compression spring to decompress, which in turn reduces the amount of force applied to the load cell.

The interior components of the testing apparatus may be replaced by removing the cover plate from the rest of the outer sleeve so as to expose the interior chamber. For example, the compression spring may be replaced with another compression spring having a greater or lesser stiffness or a different spring rate or spring profile than the replaced compression spring. The testing apparatus may also be calibrated by replacing or adjusting the above components. The cover plate may then be reattached to the rest of the outer sleeve via the connectors.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

FIG. 1 is a perspective view of an activation component testing apparatus constructed in accordance with an embodiment of the invention;

FIG. 2 is a perspective view of the activation component testing apparatus of FIG. 1 with its cover plate removed to reveal internal components;

FIG. 3 is a side elevation view of the activation component testing apparatus of FIG. 2 with its plunger in an extended position;

FIG. 4 is a side elevation view of the activation component testing apparatus of FIG. 2 with the plunger in a maximum force position.

Figure 5:
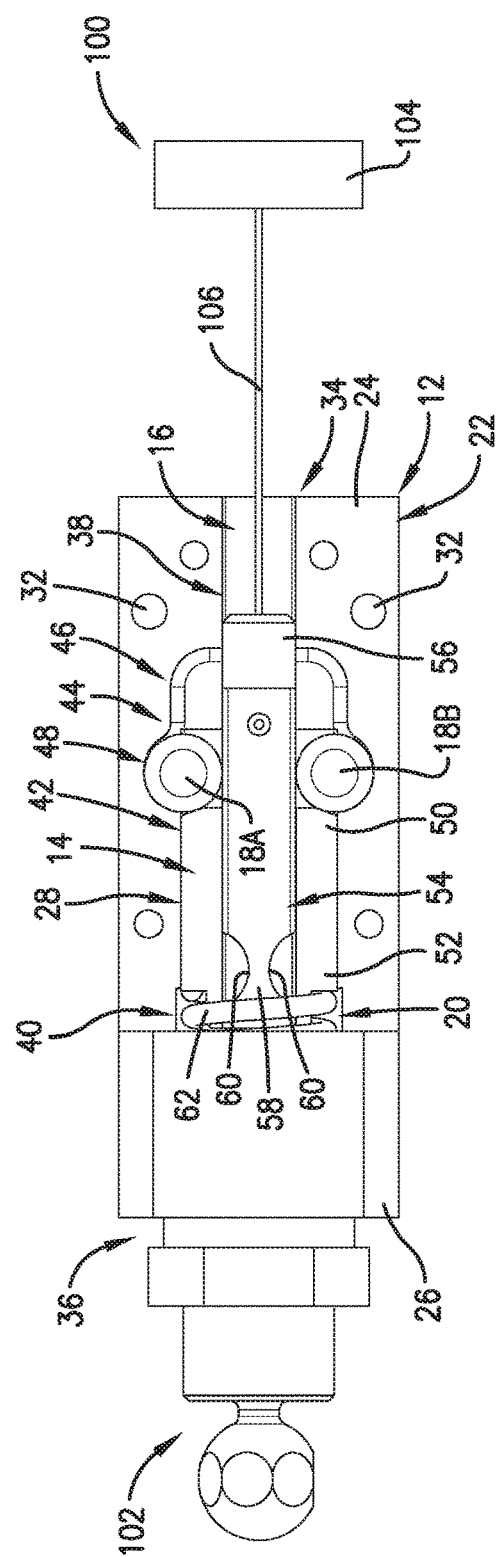
FIG. 5 is a side elevation view of the activation component testing apparatus of FIG. 2 with the plunger beyond the maximum force position.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to the drawing figures, an activation component testing apparatus 10 constructed in accordance with embodiments of the invention is illustrated. The testing apparatus 10 is configured to be coupled between an activation component 100 and a load cell 102 used to test the activation component 100. The activation component 100 may be a pushbutton, lever, knob, handle, scroll wheel, switch, or any other input device and may include a button or other surface 104 which is pushed by a user or otherwise subjected to a force and a shaft 106 for transferring the force to an electronic circuit or other component. When the activation component 100 is being tested, the shaft 106 is coupled with the testing apparatus 10 as described below. The load cell 102 may be a transducer, strain gauge, or any other suitable force or pressure sensitive component and may include studs or other connectors for attaching the load cell 102 to the testing apparatus 10.

An embodiment of the testing apparatus 10 will now be described in detail. The testing apparatus 10 broadly comprises an outer sleeve 12, an inner sleeve 14, a plunger 16, a set of bearings 18A,B, and a compression spring 20.

The outer sleeve 12 supports the other components of the testing apparatus 10 and has an outer wall 22, first and second ends 24, 26, and a hollow interior chamber 28 that extends between the first and second ends 24, 26. The outer sleeve 12 may also have a cover plate 30 that can be removed to provide access to the interior chamber 28 and a number of connectors 32 for securing the cover plate 30 over the interior chamber 28.

The interior chamber 28 has opposing first and second openings 34, 36, a plunger-receiving section 38, a spring-receiving section 40, an inner sleeve-receiving section 42, and a bearing guide section 44. The first opening 34 is positioned on the first end 24 of the outer sleeve 12 and allows the plunger 16 to translate in and out of the outer sleeve 12. The second opening 36 is positioned on the second end 26 of the outer sleeve 12 and allows the load cell 102 to be connected to the outer sleeve 12 in forcible communication with the compression spring 20. To that end, the second opening 36 may include helical threads or other features for connecting the load cell 102 to the outer sleeve 12.

The plunger-receiving section 38 communicates with the first opening 34 of the interior chamber 28 and receives the plunger 16 as described in more detail below. The plunger-receiving section 38 may have any cross-sectional shape and any internal dimensions. In one embodiment, the plunger-receiving section 38 is rectangular and has a width of approximately one half of an inch and a height of approximately one half of an inch.

The spring-receiving section 40 communicates with the second opening 36 of the interior chamber 28 and receives the compression spring 20 as described in more detail below. The spring-receiving section 40 may also have any cross-sectional shape and any internal dimensions. In one embodiment, the spring-receiving section 40 is cylindrical and has a diameter of approximately one inch.

The inner sleeve-receiving section 42 is positioned between the plunger-receiving section 38 and the spring-receiving section 40 and encloses the inner sleeve 14 as described in more detail below. The inner sleeve-receiving section 42 may also have any cross-sectional shape and any internal dimensions. In one embodiment, the inner sleeve-receiving section 42 is rectangular and has a width of approximately one inch and a height of approximately one inch.

The bearing guide section 44 is adjacent the plunger-receiving section 38 and the inner sleeve-receiving section 42 for guiding the bearings 18A, B as described in more detail below. The bearing guide section 44 has a first relatively narrower portion 46 closer to the first opening 34 of the interior chamber 28 and a second relatively wider portion 48 adjacent the inner sleeve-receiving section 42. The bearing guide section 44 may also have any cross-sectional shape and any internal dimensions. In one embodiment, the bearing guide section 44 has a depth of approximately one inch for accommodating roller bearings as described in more detail below.

The inner sleeve 14 is positioned within the inner sleeve-receiving section 42 of the interior chamber 28 and can be moved within the interior chamber 28 as described in more detail below. To that end, the inner sleeve 14 has outer dimensions slightly less than the dimensions of the inner sleeve-receiving section 42 of the interior chamber 28. The inner sleeve 14 includes opposing first and second ends 50, 52 and a hollow central chamber 54. The first end of the inner sleeve 14 may be angled or curved, the purpose of which will be described below. The hollow central chamber 54 extends between the first and second ends 50, 52 and is in axial alignment with and has approximately the same dimensions as the plunger-receiving section 38 of the interior chamber 28.

The plunger 16 translates in and out of the plunger-receiving section 38 of the interior chamber 28 and the central chamber 54 of the inner sleeve 14 as described in more detail below. The plunger 16 has opposing first and second ends 56, 58 and a plurality of bearing recesses 60 near the second end 58. The first end 56 faces or extends out of the first opening 34 of the interior chamber 28 and is configured to be connected to a shaft of the activation component 100. The second end 58 faces the inner sleeve 14 and is configured to be urged into the central chamber 54 of the inner sleeve 14 as described in more detail below. The bearing recesses 60 engage the bearings 18A,B as described in more detail below and in one embodiment include two opposing partial-cylindrical recesses.

The bearings 18A,B are positioned in the bearing guide section 44 of the interior chamber 28 and can be moved between the first and second portions 46, 48 of the bearing guide section 44 via the bearing recesses 60 of the plunger 16 as described in more detail below. In one embodiment, the bearings 18A,B are roller bearings but it will be understood that ball bearings, bushings, tapered bearings, or any other suitable bearings may be used.

The compression spring 20 is positioned in the spring-receiving section 40 for transferring force from the inner sleeve 14 to the load cell 102 as described in more detail below. The compression spring 20 includes a first end 62 configured to contact the second end 52 of the inner sleeve 14 and a second end 64 configured to be in direct or indirect (e.g., via a spacer) contact with the load cell 102. The compression spring 20 may be a cylindrical coil spring, leaf spring, coil spring, or any other suitable elastic element. In one embodiment, the compression spring 20 is a coil spring in axial alignment with the inner sleeve 14 and plunger 16.

Use of the testing apparatus will now be described in more detail. First, the activation component 100 may be connected to the first end 56 of the plunger 16 via the shaft 106. The load cell 102 may be connected to the second end 26 of the outer sleeve 12 such that the load cell 102 is in direct or indirect forcible contact with the second end 64 of the compression spring 20.

A compressive force may then be applied to the button or other surface 104 of the activation component 100 when the plunger 16 is in an extended position so that the plunger 16 is urged farther into the interior chamber 28 (i.e., towards the load cell 102). The plunger 16 in turn moves the bearings 18A,B from the first portion 46 of the bearing guide section 44 toward the second portion 48 of the bearing guide section 44 via the bearing recesses 60. The bearings 18A,B push the inner sleeve 14 as they move to the second portion 48 of the bearing guide section 44 such that the inner sleeve 14 begins to compress the compression spring 20. The compression spring 20 in turn transfers a compressive force to the load cell 102.

The amount of compressive force required to depress the activation component 100 farther, and hence the amount of compressive force transferred to the load cell 102, is directly proportional to the distance that the activation component 100 has been depressed from the extended position since the compression spring 20 is being compressed in the process. At a predetermined maximum force, the plunger 16 reaches a maximum force position at which point the bearing recesses 60 urge the bearings 18A,B into the second portion 48 of the bearing guide section 44 and out of engagement with the bearing recesses 60. This disconnects the path of force transfer between the activation component 100 and the load cell 102.

As the activation component 100 is depressed beyond the maximum force position, the plunger 16 moves farther into the interior chamber 28 without depressing the compression spring 20 farther since the bearings 18A,B are no longer in engagement with the bearing recesses 60 of the plunger 16. More importantly, the activation component 100 is no longer subjected to resistance from the compression spring 20 and the plunger 16 does not transfer additional force to the load cell 102. At the same time, the plunger 16 retains the bearings 18A,B in the second portion 48 of the bearing guide section 44 of the interior chamber 28 such that the bearings 18A,B continue to exert the predetermined maximum force on the inner sleeve 14 and hence the compression spring 20 and load cell 102. Note that the second end 58 of the plunger 16 may continue relatively unobstructed into the central chamber 54 of the inner sleeve 14.

The activation component 100 may then be withdrawn from the testing apparatus 10 or otherwise reset so as to return the plunger 16 from beyond the maximum force position. Once the plunger 16 returns to the maximum force position, the inner sleeve 14 and the outer wall 22 of the outer sleeve 12 urge the bearings 18A,B back into engagement with the bearing recesses 60 of the plunger 16. The activation component 100 may be further retracted to the extended position such that the inner sleeve 14, outer wall 22 of the outer sleeve 12, and the bearing recesses 60 of the plunger 16 also urge the bearings 18A,B back into the first portion 46 of the bearing guide section 44 of the interior chamber 28. This also allows the compression spring 20 to decompress, which in turn reduces the amount of force applied to the load cell 102.

Components of the testing apparatus 10 may be replaced by removing the cover plate 30 from the rest of the outer sleeve 14 so as to expose the interior chamber 28. For example, the compression spring 20 may be replaced with another compression spring having a greater or lesser stiffness or a different spring rate or spring profile than the replaced compression spring 20. The testing apparatus 10 may also be calibrated by replacing or adjusting the above components. The cover plate 30 may then be reattached to the rest of the outer sleeve 12 via the connectors 32.

The above-described testing apparatus 10 provides several advantages. For example, the bearings 18 disconnect the path of force transfer between the plunger 16 and the compression spring 20 when the plunger 16 is in the maximum force position such that the activation component 102 moves freely if it is subjected to additional force. This also prevents additional force from being transferred to the load cell 102.

The bearings 18A,B may be roller bearings, and the plunger 16 may have a rectangular cross section so as to decrease point load friction between the plunger 16 and the bearings 18A,B, which decreases wear and hysteresis. The compression spring 20 can be replaced with a compression spring having a greater or lesser stiffness or a different spring rate or spring profile via the cover plate 30. The testing apparatus 10 can also be calibrated by changing the plunger 16, inner sleeve 14, and/or spring travel length via the cover plate 30.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. An activation component testing apparatus comprising:
    an outer sleeve; and
    a plunger configured to be in forcible communication between an activation component and a load cell, the plunger being shiftable relative to the outer sleeve from an extended position to a maximum force position when a compressive force is applied to the activation component such that the plunger transfers the compressive force to the load cell when the plunger is in the extended position, the plunger being further shiftable relative to the outer sleeve from the maximum force position to a maximum travel position such that the plunger does not transfer additional compressive force to the load cell when the plunger is moved between the maximum force position and the maximum travel position.

2. The activation component testing apparatus of claim 1, wherein the plunger is configured to be connected to the activation component.

3. The activation component testing apparatus of claim 1, wherein the outer sleeve is configured to be connected to the load cell.

4. An activation component testing apparatus comprising:
    an outer sleeve including an outer wall having first and second ends and forming an interior chamber having a first opening near the first end and a second opening near the second end;
    an inner sleeve disposed in the interior chamber, the inner sleeve having opposing first and second ends;
    a plunger having opposing first and second ends and a plurality of bearing recesses near the second end of the plunger, the plunger being positioned at least partially in the interior chamber so that the first end of the plunger is configured to be connected to an activation component, the plunger being shiftable between an extended position and a maximum force position when a compressive force is applied to the activation component and being further shiftable between the maximum force position and a maximum travel position;
    a compression spring having opposing first and second ends, the compression spring being positioned between the inner sleeve and the second end of the outer sleeve such that the first end of the compression spring is in forcible engagement with the second end of the inner sleeve and the second end of the compression spring is configured to be in forcible engagement with a load cell connected to the second end of the outer sleeve; and
    a plurality of bearings positioned near the first end of the inner sleeve and at least partially engaged by the bearing recesses of the plunger such that the plunger is configured to transfer the compressive force through the inner sleeve and the compression spring to the load cell via the bearings when the plunger is in the extended position and urge the bearings out of engagement with the bearing recesses of the plunger when the plunger is in the maximum force position such that the plunger cannot transfer additional compressive force to the load cell when the plunger is moved between the maximum force position and the maximum travel position.

5. The activation component testing apparatus of claim 4, wherein the inner sleeve has a hollow central chamber, the second end of the plunger being configured to at least partially slide into the hollow central chamber when the plunger is moved between the maximum force position and the maximum travel position.

6. The activation component testing apparatus of claim 5, wherein the interior chamber of the outer sleeve further includes a plunger receiving section configured to align the plunger with the hollow central chamber of the inner sleeve.

7. The activation component testing apparatus of claim 4, wherein the interior chamber further includes a bearing guide section having a relatively narrow portion and a relatively wide portion, the relatively narrow portion being configured to retain the bearings in engagement with the bearing recesses of the plunger when the plunger is in the extended position, the relatively wide portion being configured to receive the bearings when the plunger urges the bearings out of engagement with the bearing recesses.

8. The activation component testing apparatus of claim 7, wherein the plunger is configured to be moved from the maximum travel position back to the maximum force position and from the maximum force position back to the extended position, the bearing guide section of the outer sleeve being configured to urge the bearings back into engagement with the bearing recesses of the plunger as the compression spring urges the inner sleeve towards the bearings when the plunger is moved from the maximum force position back to the extended position.

9. The activation component testing apparatus of claim 4, wherein the first end of the inner sleeve has a slanted or curved surface for urging the bearings out of engagement with the bearing recesses of the plunger when the plunger is moved from the extended position to the maximum force position.

10. The activation component testing apparatus of claim 4, wherein the outer sleeve includes a removable plate for providing access to the interior chamber.

11. The activation component testing apparatus of claim 10, wherein the removable plate includes connectors for retaining the removable plate over the interior chamber.

12. The activation component testing apparatus of claim 10, wherein the compression spring is configured to be replaced with another compression spring having a lessor or greater stiffness than the replaced compression spring.

13. The activation component testing apparatus of claim 4, wherein the bearings are roller bearings and the interior chamber, plunger, and inner sleeve have rectangular cross sections for decreasing point loading between the roller bearings and the plunger and inner sleeve.

14. An activation component testing apparatus comprising:
 an outer sleeve including an outer wall having first and second ends and forming an interior chamber having a first opening near the first end and a second opening near the second end;
 an inner sleeve disposed in the interior chamber, the inner sleeve having opposing first and second ends and a hollow central chamber;
 a plunger having opposing first and second ends and a plurality of bearing recesses near the second end of the plunger, the plunger being positioned at least partially in the interior chamber near the first opening so that the first end of the plunger is configured to be connected to an activation component, the plunger being shiftable between an extended position and a maximum force position when a compressive force is applied to the activation component and being further shiftable between the maximum force position and a maximum travel position;
 a coil spring having opposing first and second ends, the coil spring being positioned between the inner sleeve and the second end of the outer sleeve such that the first end of the coil spring is in forcible engagement with the second end of the inner sleeve and the second end of the coil spring is configured to be in forcible engagement with a load cell connected to the second end of the outer sleeve; and
 a plurality of roller bearings positioned near the first end of the inner sleeve and at least partially engaged by the bearing recesses of the plunger such that the plunger is configured to transfer the compressive force through the inner sleeve and the coil spring to the load cell via the roller bearings when the plunger is in the extended position and urge the roller bearings out of engagement with the bearing recesses of the plunger when the plunger is in the maximum force position such that the plunger cannot transfer additional compressive force to the load cell when the plunger is moved between the maximum force position and the maximum travel position, the hollow central chamber of the inner sleeve being configured to receive the second end of the plunger when the plunger is moved between the maximum force position and the maximum travel position.

15. The activation component testing apparatus of claim 14, wherein the interior chamber of the outer sleeve further includes a plunger receiving section configured to align the plunger with the hollow central chamber of the inner sleeve.

16. The activation component testing apparatus of claim 14, wherein the interior chamber further includes a bearing guide section having a relatively narrow portion and a relatively wide portion, the relatively narrow portion being configured to retain the roller bearings in engagement with the bearing recesses of the plunger when the plunger is in the extended position, the relatively wide portion being configured to receive the roller bearings when the plunger urges the roller bearings out of engagement with the bearing recesses.

17. The activation component testing apparatus of claim 16, wherein the plunger is configured to be moved from the maximum travel position back to the maximum force position and from the maximum force position back to the extended position, the bearing guide section of the outer sleeve being configured to urge the roller bearings back into engagement with the bearing recesses of the plunger as the coil spring urges the inner sleeve towards the roller bearings when the plunger is moved from the maximum force position back to the extended position.

18. The activation component testing apparatus of claim 14, wherein the first end of the inner sleeve has a slanted or curved surface for urging the roller bearings out of engagement with the bearing recesses of the plunger when the plunger is moved from the extended position to the maximum force position.

19. The activation component testing apparatus of claim 14, wherein the outer sleeve includes a removable plate for providing access to the interior chamber for replacing the coil spring with another coil spring having a lessor or greater stiffness than the replaced coil spring.

20. An activation component testing apparatus comprising:
 an outer sleeve including an outer wall having first and second ends and forming an interior chamber having a first opening near the first end, a second opening near the second end, and a bearing guide section having a relatively narrow portion and a relatively wide portion;

an inner sleeve disposed in the interior chamber, the inner sleeve having opposing first and second ends and a hollow central chamber;

a plunger having opposing first and second ends and a plurality of bearing recesses near the second end of the plunger, the plunger being positioned at least partially in the interior chamber so that the first end of the plunger is configured to be connected to an activation component, the plunger being shiftable between an extended position and a maximum force position when a compressive force is applied to the activation component and being further shiftable between the maximum force position and a maximum travel position;

a coil spring having opposing first and second ends, the coil spring being positioned between the inner sleeve and the second end of the outer sleeve such that the first end of the coil spring is in forcible engagement with the second end of the inner sleeve and the second end of the coil spring is configured to be in forcible engagement with a load cell connected to the second end of the outer sleeve; and a plurality of roller bearings positioned in the relatively narrow portion of the bearing guide section and at least partially engaged by the bearing recesses of the plunger such that the plunger is configured to transfer the compressive force through the inner sleeve and the coil spring to the load cell via the roller bearings when the plunger is in the extended position and urge the roller bearings into the relatively wide portion of the bearing guide section and out of engagement with the bearing recesses of the plunger when the plunger is in the maximum force position such that the plunger cannot transfer additional compressive force to the load cell when the plunger is moved between the maximum force position and the maximum travel position, the hollow central chamber of the inner sleeve being configured to receive the second end of the plunger when the plunger is moved between the maximum force position and the maximum travel position.

* * * * *